May 20, 1958
F. D. JOESTING
2,835,449
AIR BLENDER FOR AIR CONDITIONING HAVING
TEMPERATURE AND PRESSURE CONTROL
Filed June 26, 1953
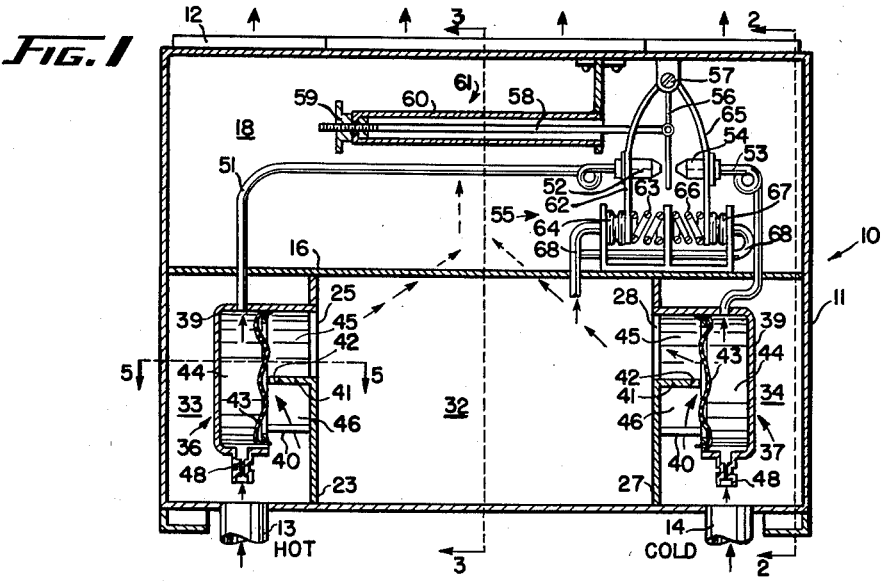
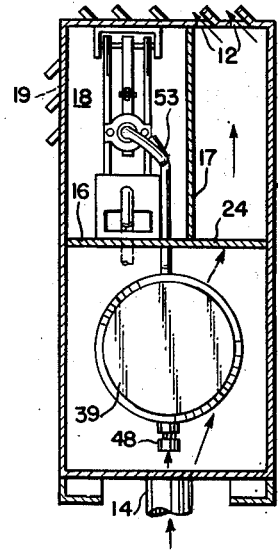
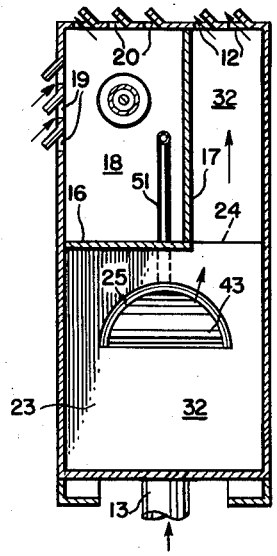
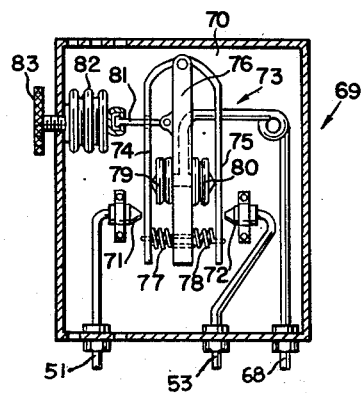
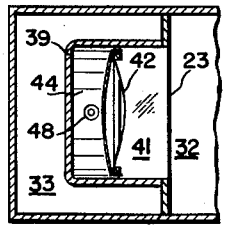
*INVENTOR.*
FREDERICK D. JOESTING
BY George H Fisher
*ATTORNEY*

United States Patent Office 2,835,449
Patented May 20, 1958

2,835,449

AIR BLENDER FOR AIR CONDITIONING HAVING TEMPERATURE AND PRESSURE CONTROL

Frederick D. Joesting, Oak Park, Ill., assignor to Minneapolis-Honeywell Regulator Company, Minneapolis, Minn., a corporation of Delaware Application June 26, 1953, Serial No. 364,356

6 Claims. (Cl. 236—13)

This invention relates to improved control apparatus for air-conditioning equipment.

A type of air-conditioning apparatus having many advantages uses a pair of relatively small, high pressure (one-half inch to six inches of water) ducts for supplying air to the desired spaces or rooms, one of the ducts supplying relatively cool air and the other relatively warm air so that a proper blending of the air from the two ducts will give a desired discharge air temperature, while air from one or the other of the ducts alone will meet the extreme temperature conditions expected. Thus, this type of apparatus provides air for ventilation and also supplies the air at such temperatures as to meet the temperature changing requirements of the spaces or rooms into which it is directed.

Apparatus of this sort ordinarily does not use common outlet registers but rather uses a blender or unit ventilator wherein the ducts discharge into a plenum or mixing chamber and thence into a space or room, the plenum chamber not only permitting mixing of the air but also reducing noise. In addition, the unit ventilator or blender which includes such a plenum chamber, generally houses the valves and control apparatus necessary for controlling the flow from the respective ducts, although, of course, these components may be remotely located if desired. Until the present invention, each unit ventilator or blender included a valve for each duct, a motor for operating the valves, and thermostatic control apparatus for the motor, the control apparatus requiring either electric wiring or pneumatic piping to each unit, with a consequent relatively high cost.

The present invention provides a self-contained thermostatically controlled apparatus for such unit ventilators or blenders wherein the motive power for the valves is obtained from the duct air pressure alone, thereby eliminating exterior wiring or piping and effecting a considerable cost saving.

If the air pressures in the ducts leading to each unit ventilator were substantially constant, a relatively simple control system would be entirely adequate and, by properly proportioning the valve sizes and the like, excessive plenum pressures, and consequent noise problems, would be easily avoided and a correct amount of air for ventilation would be provided. As might be expected, however, in systems as installed, due to variations in the lengths of the ducts in various parts of a building, the varying loads imposed on the apparatus, the operating characteristics of the air-conditioning apparatus supplying air to the ducts, and other such matters, the pressures in the ducts varies considerably. As a consequence, the valves and other such equipment in the unit ventilators or blenders must be proportioned and adjusted to supply adequate air from either duct at the minimum pressure expected in such ducts. This, of course, tends to give excessive discharge pressures and noise when the duct pressures are above such minimums or else require relatively expensive pressure regulating devices. The present invention solves this problem of excessive pressures by combining pressure control with the temperature control and thereby not only controls the discharge pressure to avoid noise and maintain a correct amount of air but also improves the temperature control.

It is therefore an object of this invention to provide an improved temperature control apparatus for high pressure double duct air-conditioning systems.

It is a further object to adequately control the discharge pressure of high pressure double duct air-conditioning systems and it is an additional object to combine temperature and pressure control apparatus for such systems to not only properly control the discharge pressure but also to improve the temperature control of such systems.

These and other objects will become apparent upon a study of the following specification and drawings wherein—

Figure 1 schematically shows a unit ventilator or blender, with parts in section, incorporating the present invention.

Figure 2 is a cross-sectional view taken on line 2—2 of Figure 1.

Figure 3 is a cross-sectional view taken on the line 3—3 of Figure 1.

Figure 4 shows schematically a modified control apparatus useable in place of that shown in Figure 1.

Figure 5 is a sectional view taken on the lines 5—5 of Figure 1.

In Figure 1, a unit ventilator or blender 10 comprises an outer housing 11, discharge openings 12, a hot air inlet 13 and a cold air inlet 14. Within the housing 11, a horizontally disposed partition member 16 and a vertically disposed member 17 isolates a space 18 from the interior of the housing, space 18 being connected to the outside ambient atmosphere by inlet openings 19 and outlet openings 20, flow through space 18 being induced by air flowing out of discharge openings 12.

The portion of housing 11 into which supply conduit 13 discharges is enclosed by parts of the housing and a transverse vertical partition member 23, horizontal partition member 16, and an adjacent horizontal partition member 24 (shown in Figure 3), partition member 23 having a semi-circular opening 25 therein.

In a similar fashion, conduit 14 opens into a space within housing 11 bounded in part by the housing 11 and by a vertical partition member 27 having a semi-circular opening 28, a portion of the horizontally disposed partition member 16 and an adjacent horizontally disposed partition member 29 (Figure 2). The remaining space within the housing 11, including the space between vertical partitions 23 and 27 and the space behind partition 17 is called a plenum or mixing chamber and is identified by numeral 32.

Thus, an enclosed space or passage 33 extends from conduit 13 to opening 25 into plenum 32 and a similarly enclosed space 34 extending from inlet conduit 14 through opening 28 into the plenum 32 constitutes a second passage for air flow.

Flow through the passage 33 is controlled by a valve generally indicated as 36 and flow through the passage 34 is controlled by a valve 37, both of these valves being identical but facing in opposite directions. Because of their similarity, the same numerals are applied to the parts of each and a description of one valve applies equally well to the other. Thus, valve 36 comprises an outer housing 39 of generally cylindrical shape having a head and a lower cut-away portion 40, valve 37 being similar. The valve 36 also includes a horizontally disposed bridging or seat member 41 extending across the housing 39, this member 41 having a concave seating edge 42 facing to the left in valve 36 and to the right in valve 37. Also, a flexible diaphragm 43, of a neoprene impregnated nylon fabric, for instance, is sealingly attached around the inner surface of housing 39 and adjacent the cut off portion 40 to thereby divide the housing into a motor chamber 44, a discharge portion 45 and an inlet portion 46, with flow between inlet portion 46 and discharge portion 45 being between diaphragm 43 and the concave surface 42 of member 41. With this arrangement, when diaphragm 43 is expanded by pressure in chamber 44 into full engagement with the surface 42 of member 41, flow is prevented between portions 46 and 45 but, when the average pressure in the inlet portion 46 and plenum 32 is sufficiently high, relative to the pressure in chamber 44, the diaphragm 43 will be spaced from the concave surface 42 and flow will then be permitted between the diaphragm and the member 41 so that air can then flow from inlet conduit 13 through the cut-away portion 40 of the housing 39 into the inlet portion 46 of the valve, between member 41 and diaphragm 43 and through discharge portion 45 of the valve and opening 25 into the plenum 32 from which the air discharges into the space through openings 12. Likewise, the same flow path may be traced from conduit 14 through opening 28 into the plenum 32.

From this description, it is obvious that the relative pressures in chamber 44 and the pressures in passages 33 or 34 and the plenum 32 determines the positions of diaphragm 43. Air is introduced into chamber 44 through a restricted inlet conduit 48, this being similar in both valves. The chamber 44 of valve 36 is also connected by a conduit 51 to a nozzle 52 and chamber 44 of valve 37 is connected by conduit 53 to nozzle 54, nozzles 52 and 54 being part of a control apparatus generally identified by the numeral 55. A flapper means 56 pivoted at 57 is disposed between nozzles 52 and 54 and is movable toward and away from these nozzles to control air flow therethrough. Nozzle flapper 56 is adjusted by a non-expansible rod 58 adjustably connected at 59 to an expansible tube 60. An expansion of tube 60 due to a relatively high temperature affecting the same tends to cause a movement of rod 58 to the left and thereby moves flapper means 56 adjacent nozzle 52 whereas a contraction of tube 60 due to relatively cool air affecting it causes movement of rod 58 to the right and thereby closer to nozzle 54. While the rod and tube thermostat 61 comprising rod 58 and tube 60 is quite satisfactory, it is obvious that any conventional thermostatic means may be used to actuate flapper means 56. Nozzle 52 is carried on a pivoted support member 62 biased to the left by a compression spring 63 and biased to the right by a bellows 64, nozzle 54 being similarly carried by a pivoted supporting means 65 biased to the right by spring 66 and biased to the left by a bellows 67, supporting means 62 and 65 both preferably being pivoted on the same axis as is flapper means 56. The interiors of bellows 64 and 67 are connected by conduit means 68 to plenum 32 so that the pressure in the plenum or mixing chamber is communicated to the bellows. An increase in plenum pressure tends to move supporting means 62 and 65 toward each other and against the forces of springs 63 and 66 whereas a decrease in the pressure in the plenum permits springs 63 and 66 to move members 62 and 65, and their attached nozzles, away from each other. While control device 55 is preferably built in the unit ventilator 10, it can, of course, be remotely located if desired.

Obviously, the control apparatus above described is only illustrative of means responsive to both temperature and pressure for controlling the present air-conditioning apparatus. To show another simple and effective manner of combining these types of control in a device that can be located in space 18 if desired or can be remotely located, the apparatus in Figure 4 is designed for attachment to a wall. This device 69 comprises a base 70, the cover being removed, a stationary nozzle 71, corresponding to the above movable nozzle 52, and a stationary nozzle 72, corresponding to the previously described movable nozzle 54. Nozzle 71 is attached to a suitable fitting adapted to be connected to a conduit such as 51 and nozzle 72 is connected to a similar fitting adapted to be connected to conduit 53. In this case, however, flapper means 73 includes a left side pivoted member 74 having a portion coacting with nozzle 71, a right side member 75 having a portion coacting with nozzle 72, and a central portion 76 extending between portions 74 and 75 and connected to members 74 and 75 by tension springs 77 and 78, respectively. In addition, a bellows 79 extends between member 76 and member 74 and a bellows 80 extends between member 76 and member 75. Bellows 79 and 80 are connected together and to a fitting adapted to be connected to conduit 68 leading to the plenum of the unit air-conditioner. The member 76 is operated by a link 81 rotatively attached to a fluid filled thermostatic element 82 adjustably attached to device 69 by a threaded means, the adjustment being effected by knob 83.

To better show the functioning of the present apparatus, its operation will now be described.

Assuming that hot air is available through conduit 13 at pressures between ½ and 6 inches of water, and cold air is likewise available through conduit 14 at similar pressures, and also assuming that the temperature in the space in which unit ventilator 10 is located is substantially correct, flapper means 56 is equally spaced from nozzles 52 and 54 by the control means 55. As shown, the air from conduit 13 is flowing through inlet portion 46 of the valve 39 in passage 33, between diaphragm 43 and member 41, through the discharge portion 45 of the valve and opening 25 into plenum 32 from which it discharges through the openings 12 at the top of the apparatus. Similarly, the cold air is flowing through the inlet portion 46 of the valve in passage 34, between the diaphragm 43 and member 41 and the outlet passage 35 and opening 28 into the plenum 32. With both the cold and warm air flowing in opposite directions into the plenum chamber 32, a very good mixing ensues so that the air being discharged through openings 12 is quite uniform in temperature. In addition, air is flowing from passage 33 into chamber 44 of the one valve and through the similar restriction from passage 34 into the chamber 44 of the other valve. The air flowing intto the chamber 44 of valve 36 is being discharged through conduit 51 and nozzle 52, this being permitted because flapper means 56 is somewhat spaced from nozzle 52. Similarly, the air from chamber 44 of valve 37 is being discharged through conduit 53 and nozzle 54 because the flapper means 56 is also spaced from this nozzle. The over-all spacing of the nozzles from flapper means 56 is controlled by bellows 64 and spring 63 acting against member 62 and spring 66 and bellows 67 controlling the position of member 65, the pressure in these bellows being determined by the plenum pressure.

Should the temperature in the room, and thus the temperature of the air flowing into space 18 through openings 19 and out through openings 20, due to induction caused by the air moving through openings 12, decrease, then tube 60 tends to contract and to move the non-expansible member of the thermostat, rod 58, to the right and thereby increase the spacing between nozzle 52 and flapper 56 and decrease the spacing between the flapper means and nozzle 54. This permits a higher rate of flow from nozzle 52 and thereby diminishes the air pressure in the motor chamber 44 of valve 36, thereby permitting the diaphragm 43 to be forced further to the left by the pressure in passage 33 and in the plenum 32 and thus permitting an increased flow of air from conduit 13 into the plenum. Simultaneously, the further closing of nozzle 54 tends to decrease the flow from the motor chamber 44 of valve 37 in passage 34 and thereby increases the pressure behind diaphragm 43 of that valve, thereby forcing it in a closing direction to further restrict the flow of air from the cold conduit 14 into the plenum. As a result, the air flowing out discharge openings 12 from the device is warmer and tends to increase the temperature in the space.

Should the space temperature, as sensed by the expansible tube 60 of the thermostat increase, the movement of the flapper means 56 would then be to the left, which would tend to decrease the flow of warm air and increase the flow of the cold air in the same manner as above described, thereby meeting the requirements of the space.

Simultaneously with this temperature control of the apparatus, an increase in the plenum pressure causes bellows 64 and 67 to expand against springs 63 and 66, respectively. The expansion of these bellows tends to move members 62 and 65 closer together and thereby decrease the spacing of nozzles 52 and 54, respectively, from flapper means 56. The decreased spacing of the nozzles from the flapper means tends to restrict air flow from the nozzles and thus increase the pressure in their respective motor chambers 44, this increased pressure acting to restrict the flow of air from conduits 13 and 14 by moving the diaphragms 43 closer to their bridging or seat members 41. The effect of the decreased flow of air through both of the passages 33 and 34 is to diminish the plenum pressure and thereby restore this pressure to the desired value. Likewise, should the plenum pressure fall lower than is desired, the decrease in pressure in bellows 64 and 67 permits springs 63 and 66 to move members 62 and 65 further away from each other and to move their respective nozzles 52 and 54 further away from flapper means 56. The increased spacing of the nozzles permits a freer flow of air from the motor chambers 44 and thereby diminishes the pressure in these chambers, thus causing the diaphragms to assume a more open position, so far as flow is concerned, and increasing the rate of flow into the plenum chamber, to thereby maintain the pressure in the chamber at a value sufficient to give the desired rate of air flow.

The operation of the apparatus using the modification of Figure 4 is closely similar to that above described with the exception that a decrease in air pressure in bellows 79 and 80 permits springs 77 and 78 to move the flapper means 74 and 75 closer together, thereby increasing the spacing between these members and their respective nozzles 71 and 72. Similarly, an increase in pressure in conduit 68 causes an expansion of bellows 79 and 80 and a consequent expansion of members 74 and 75 in nozzle closing directions, to thereby increase the resistance to flow from the nozzles 71 and 72 and, as a consequence, increase the pressure in the respective motor chambers to thereby further close the valves and diminish the flow rates thereof. Temperature control is effected in a similar fashion with the fluid filled thermostatic element 80 moving the flapper apparatus 73 as a unit toward or away from nozzles 71 and 72, the flapper means 73 being similar, so far as temperature control is concerned, to the flapper means 56 in the above example.

As many other substitutions and equivalents will become apparent upon a study of this specification and drawings, the scope of the invention should be determined only by the appended claims wherein I claim:

1. In air conditioning apparatus, a device having a plenum chamber and a discharge opening from said chamber, first and second oppositely disposed passages opening into said plenum chamber, a valve means for controlling each of said first and second passages, each of said valve means including a pneumatic motor having a pressure chamber, individual conduit means for supplying air to each of said passages, restricted conduit means connecting the supply conduit means for the first passage to the pressure chamber of the motor for the first passage valve and a similar restricted conduit means connecting the supply conduit means for the second passage to the pressure chamber of the motor for the second passage valve, a control valve mechanism including a pair of spaced oppositely disposed nozzles, one of said nozzles being connected to one of said motor pressure chambers and the other of said nozzles being connected to the other of said motor pressure chambers, said nozzles being of greater flow capacity than said restricted conduit means, movable flapper means arranged between said nozzles to simultaneously and oppositely control air flow through both of said nozzles so that upon increasing the resistance to flow of one it decreases the flow resistance of the others, or vice versa, thereby controlling both of said valve motors in opposite directions, temperature responsive means for moving said flapper means, and means responsive to pressure in said plenum chamber for simultaneously and similarly varying the spacing between both of said nozzles to either increase or decrease the resistance to flow of both and thereby control both of said valve motors in a similar direction in accordance with pressure.

2. In air conditioning apparatus, a device having a plenum chamber and a discharge opening from said chamber, first and second passages opening into said plenum chamber, a valve means for controlling each of said passages, each of said valve means being fluid operated, individual conduit means for supplying air to each of said passages, restricted conduit means connecting the supply conduit means for the first passage to the valve for said first passage and a similar restricted conduit means connecting the supply conduit means for the second passage to the valve for the second passage, a control valve mechanism including a pair of spaced oppositely disposed nozzles, one of said nozzles being connected to the fluid operated valve of one of said passages and the other of said nozzles being connected to the fluid operated valve of the other passage, said nozzles being of greater flow capacity than said restricted conduit means, movable flapper means arranged to control the air flow through both of said nozzles in a simultaneous and opposite manner, temperature responsive means for moving said flapper means toward one of said nozzles and away from another of said nozzles to thereby control both of said valve means in accordance with temperature, and means responsive to the flow of air from said plenum for simultaneously varying the spacing between both of said nozzles and said flapper means to further control air flow through both nozzles to thereby control simultaneously and in the same direction both of said valve means in accordance with total air flow.

3. In air conditioning apparatus, a device having a plenum chamber and a discharge opening from said chamber, first and second oppositely disposed passages opening into said plenum chamber, valve means for controlling each of said first and second passages, each of said valve means being pneumatically operable and having a pressure chamber, individual conduit means for supplying air to each of said passages, restricted conduit means connecting the supply conduit means for the first passage to the pressure chamber of the first valve and a similar restricted conduit means connecting the supply conduit means for the second passage to the pressure chamber of the second valve, a control valve mechanism including a pair of spaced oppositely disposed movable nozzles the output of one being directed toward the output of the other, said nozzle being connected to the pressure chamber of said first valve and said other nozzle being connected to the pressure chamber of the second valve, said nozzles being of greater flow capacity than said restricted conduit means, movable flapper means arranged to simultaneously and oppositely control the resistance to air flow of both of said nozzles so that when said one nozzle is further restricted the other is forced open and vice versa, temperature responsive means for moving said flapper means to thereby control both of said valve means in accordance with temperature, and means responsive to air flow from said plenum for simultaneously and similarly moving said nozzles toward and away from each other to reduce the flow of each or increase the flow of each, respectively to thereby control both of said valve means in accordance with the total air flow from the plenum.

4. In air conditioning apparatus, a device having a plenum chamber and a discharge opening from said chamber, first and second oppositely disposed passages opening into said plenum chamber, a valve means for controlling each of said first and second passages, each of said valve means being pneumatically operable and having a pressure chamber, individual conduit means for supplying air to each of said passages, restricted conduit means connecting the supply conduit means for the first passage to the pressure chamber of the valve for the first passage and a similar restricted conduit means connecting the supply conduit means for the second passage to the pressure chamber of the valve for the second passage, a control valve mechanism including a pair of spaced oppositely disposed nozzles the outputs of each being direct toward the other, one of said nozzles being connected to the pressure chamber of the first valve and the other of said nozzles being connected to the pressure chamber of the second valve, said nozzles being of greater flow capacity than said restricted conduit means, movable flapper means having oppositely disposed relatively movable nozzle closing portions mounted between said nozzles so that said portions are effective to restrict the flow from said nozzles, pressure responsive means arranged between said relatively movable portions, means connecting said pressure responsive means to said plenum chamber whereby pressure changes in said chamber causes said portions of said flapper means to move toward and away from said nozzles to simultaneously vary the spacing between said nozzles and said flapper means, and means responsive to temperature for moving said flapper means as a unit between said nozzles to simultaneously and oppositely vary the spacing between said flapper means and said nozzles to thereby control said valve means in accordance with temperature.

5. In air conditioning apparatus for controlling the temperature in a room, a hot supply conduit and a cold supply conduit, a mixing chamber having an exhaust passage to the room, first and second valve means, means including said first valve means for connecting said hot supply to said chamber, means including said second valve for connecting said cold supply to said chamber, said valve means each having an operator receiving air under pressure from its associated supply conduit and each having an exhaust for exhausting air from said operator to open the valve, pilot valve means having two discharge passages and a movable member operating therebetween so that movement of said member oppositely effects the flow from said passages, means connecting said exhaust of said valve operators to said discharge passages, respectively, temperature responsive means responsive to room temperature connected to control the position of said member and thus control the proportion of hot and cold air being delivered to the room, means for simultaneously varying the spacing between said passages and said member to modify the effect of said member on said passages and simultaneously decrease or increase the flow of each passage, and pressure responsive means responsive to the pressure in said mixing chamber for controlling said last mentioned means.

6. In air conditioning apparatus for controlling the temperature in a room, a hot supply conduit and a cold supply conduit, a mixing chamber having an exhaust passage to the room, first and second valve means, means including said first valve means for connecting said hot supply to said chamber, means including said second valve for connecting said cold supply to said chamber, said valve means each having an actuator receiving air under pressure from a supply and each having an exhaust for exhausting air from said actuator to open the valve, pilot valve means having two orifices and a movable member operating therebetween so that movement of said member oppositely effects the flow from said orifices, means connecting said exhaust of said valve operators to said orifices, temperature responsive means responsive to room temperature connected to control the position of said member and thus control the proportion of hot and cold air being delivered to the room, means for simultaneously varying the spacing between said orifices and said movable member to modify the effect of said member on said orifices and simultaneously decrease or increase the flow of both orifices, and pressure responsive means responsive to the rate of air flow from said exhaust passage for controlling said last mentioned means.

References Cited in the file of this patent

UNITED STATES PATENTS

| Number | Name | Date |
|---|---|---|
| 510,017 | Gassett | Dec. 5, 1893 |
| 699,352 | Titus | May 6, 1902 |
| 2,062,437 | Abbott | Dec. 1, 1936 |
| 2,220,176 | Rosenberger | Nov. 5, 1940 |
| 2,266,217 | Kingsland | Dec. 16, 1941 |
| 2,507,621 | Branson | May 16, 1950 |
| 2,508,074 | Miller et al. | May 16, 1950 |
| 2,620,983 | Lyman | Dec. 9, 1952 |
| 2,710,724 | McMahon | June 14, 1955 |
| 2,793,812 | McDonald | May 28, 1957 |

FOREIGN PATENTS

| 253,317 | Great Britain | June 17, 1926 |